(12) United States Patent
Gittleman et al.

(10) Patent No.: US 9,077,796 B2
(45) Date of Patent: Jul. 7, 2015

(54) SYSTEM CONTAINING A MOBILE COMMUNICATION DEVICE AND ASSOCIATED DOCKING STATION

(75) Inventors: Daniel Gittleman, Delray Beach, FL (US); Paul Krzyzanowski, Flemington, NJ (US)

(73) Assignee: OPENPEAK INC., Boca Raton, FL (US)

( * ) Notice: Subject to any disclaimer, the term of this patent is extended or adjusted under 35 U.S.C. 154(b) by 783 days.

(21) Appl. No.: 13/211,947

(22) Filed: Aug. 17, 2011

(65) Prior Publication Data

US 2012/0046074 A1    Feb. 23, 2012

Related U.S. Application Data

(60) Provisional application No. 61/374,504, filed on Aug. 17, 2010.

(51) Int. Cl.
| | |
|---|---|
| *H04B 1/38* | (2006.01) |
| *H04M 1/04* | (2006.01) |
| *H04M 1/725* | (2006.01) |

(52) U.S. Cl.
CPC ............ *H04M 1/04* (2013.01); *H04M 1/72527* (2013.01); *H04M 1/7253* (2013.01); *H04M 2250/02* (2013.01)

(58) Field of Classification Search
CPC ..... H04W 88/06; H04W 88/02; H04W 4/008; H04W 4/16; H04W 4/20; H04W 52/0274; H04W 84/08; H04W 84/105; H04W 84/16
USPC ........................................................ 455/557
See application file for complete search history.

(56) References Cited

U.S. PATENT DOCUMENTS

| | | | |
|---|---|---|---|
| 5,265,951 A | 11/1993 | Kumar | |
| 5,294,782 A | 3/1994 | Kumar | |

(Continued)

FOREIGN PATENT DOCUMENTS

| | | |
|---|---|---|
| WO | 2010/080498 A1 | 7/2010 |
| WO | 2010/080500 A1 | 7/2010 |
| WO | 2012/024418 A1 | 2/2012 |

OTHER PUBLICATIONS

International Search Report and Written Opinion for International Appl. No. PCT/US2009/068475, mailed on Apr. 23, 2010, 17 pages.

(Continued)

*Primary Examiner* — Kwasi Karikari

(57) ABSTRACT

A communication system is described that includes a mobile communication device and a docking station with which the mobile communication device can be selectively engaged and disengaged. The mobile communication device includes telephony logic that enables a user to conduct a voice call using a first speaker/microphone and/or a first network interface provided by the mobile communication device when the mobile communication device is disengaged from the docking station and that enables the user to conduct a voice call using a second speaker/microphone and/or a second network interface provided by the docking station when the mobile communication device is engaged with the docking station. The telephony logic is also capable of dynamically switching between the use of the first and second speakers/microphones and/or the first and second network interfaces in response to detecting engagement or disengagement of the docking station during a voice call.

26 Claims, 8 Drawing Sheets

(56) References Cited

U.S. PATENT DOCUMENTS

| | | |
|---|---|---|
| 5,357,585 A | 10/1994 | Kumar |
| 5,381,348 A | 1/1995 | Ernst et al. |
| 5,386,106 A | 1/1995 | Kumar |
| 5,484,989 A | 1/1996 | Kumar et al. |
| 5,489,001 A | 2/1996 | Yang |
| 5,489,773 A | 2/1996 | Kumar |
| 5,519,783 A | 5/1996 | Kumar |
| 5,521,369 A | 5/1996 | Kumar |
| 5,548,477 A | 8/1996 | Kumar et al. |
| 5,548,478 A | 8/1996 | Kumar et al. |
| 5,616,906 A | 4/1997 | Kumar |
| 5,632,373 A | 5/1997 | Kumar et al. |
| 5,638,257 A | 6/1997 | Kumar et al. |
| 5,648,760 A | 7/1997 | Kumar |
| 5,696,496 A | 12/1997 | Kumar |
| 5,708,560 A | 1/1998 | Kumar et al. |
| 5,872,699 A | 2/1999 | Nishii et al. |
| 5,902,991 A | 5/1999 | Kumar |
| 5,925,873 A | 7/1999 | Kumar |
| 6,027,021 A | 2/2000 | Kumar |
| 6,072,401 A | 6/2000 | Kumar |
| 6,084,769 A | 7/2000 | Moore et al. |
| 6,104,451 A | 8/2000 | Matsuoka et al. |
| 6,151,606 A | 11/2000 | Mendez |
| 6,181,553 B1 | 1/2001 | Cipolla et al. |
| 6,223,815 B1 | 5/2001 | Shibasaki |
| 6,266,539 B1 | 7/2001 | Pardo |
| 6,276,448 B1 | 8/2001 | Maruno |
| 6,314,303 B1 * | 11/2001 | Phipps ............ 455/555 |
| 6,449,149 B1 | 9/2002 | Ohashi et al. |
| 6,457,030 B1 | 9/2002 | Adams et al. |
| 6,647,103 B2 | 11/2003 | Pinard et al. |
| 6,674,640 B2 | 1/2004 | Pokharna et al. |
| 6,708,221 B1 | 3/2004 | Mendez et al. |
| 6,952,617 B1 | 10/2005 | Kumar |
| 6,952,671 B1 | 10/2005 | Kolesnik et al. |
| 7,058,088 B2 | 6/2006 | Tomita et al. |
| 7,120,462 B2 | 10/2006 | Kumar |
| 7,130,193 B2 | 10/2006 | Hirafuji et al. |
| 7,149,543 B2 | 12/2006 | Kumar |
| 7,236,770 B2 | 6/2007 | Sankaramanchi |
| 7,243,163 B1 | 7/2007 | Friend et al. |
| 7,275,073 B2 | 9/2007 | Ganji et al. |
| 7,301,767 B2 | 11/2007 | Takenoshita et al. |
| 7,447,799 B2 | 11/2008 | Kushner |
| 7,574,177 B2 | 8/2009 | Tupman et al. |
| 7,574,200 B2 | 8/2009 | Hassan et al. |
| 7,577,462 B2 | 8/2009 | Kumar |
| 7,620,001 B2 | 11/2009 | Ganji |
| 7,627,343 B2 | 12/2009 | Fadell et al. |
| 7,702,322 B1 | 4/2010 | Maurya et al. |
| 7,778,035 B2 | 8/2010 | Huang et al. |
| 7,788,382 B1 | 8/2010 | Jones et al. |
| 7,823,214 B2 | 10/2010 | Rubinstein et al. |
| 7,869,789 B2 | 1/2011 | Hassan et al. |
| 7,885,645 B2 | 2/2011 | Postma et al. |
| 7,970,386 B2 | 6/2011 | Bhat et al. |
| 8,012,219 B2 | 9/2011 | Mendez et al. |
| 8,086,332 B2 | 12/2011 | Dorogusker et al. |
| 8,099,090 B2 | 1/2012 | Postma et al. |
| 8,185,149 B2 | 5/2012 | Forstall et al. |
| 2002/0013852 A1 | 1/2002 | Janik |
| 2002/0172336 A1 | 11/2002 | Postma et al. |
| 2003/0090864 A1 | 5/2003 | Kuo |
| 2004/0060687 A1 | 4/2004 | Moss |
| 2004/0078812 A1 | 4/2004 | Calvert |
| 2004/0190256 A1 | 9/2004 | Genova et al. |
| 2005/0131885 A1 | 6/2005 | Komatsu et al. |
| 2005/0144445 A1 | 6/2005 | Yeap et al. |
| 2005/0213331 A1 | 9/2005 | Lewis |
| 2006/0030341 A1 | 2/2006 | Pham |
| 2006/0200658 A1 | 9/2006 | Penkethman |
| 2007/0080823 A1 | 4/2007 | Fu et al. |
| 2007/0169105 A1 | 7/2007 | Amberny et al. |
| 2007/0183772 A1 | 8/2007 | Baldwin et al. |
| 2008/0070495 A1 | 3/2008 | Stricklen et al. |
| 2008/0081610 A1 * | 4/2008 | Bhalla ............ 455/425 |
| 2008/0125079 A1 | 5/2008 | O'Neil et al. |
| 2010/0157543 A1 | 6/2010 | Shohet et al. |
| 2010/0157989 A1 | 6/2010 | Krzyzanowski et al. |
| 2010/0157990 A1 | 6/2010 | Krzyzanowski et al. |
| 2010/0222097 A1 | 9/2010 | Gisby et al. |
| 2010/0328064 A1 | 12/2010 | Rogel |
| 2010/0330953 A1 | 12/2010 | Rogel et al. |
| 2010/0330961 A1 | 12/2010 | Rogel |
| 2010/0332635 A1 | 12/2010 | Rogel et al. |
| 2010/0333088 A1 | 12/2010 | Rogel et al. |
| 2011/0004941 A1 | 1/2011 | Mendez et al. |
| 2011/0038120 A1 | 2/2011 | Merz et al. |
| 2011/0225252 A1 | 9/2011 | Bhat et al. |
| 2012/0070017 A1 | 3/2012 | Dorogusker et al. |
| 2012/0088481 A1 * | 4/2012 | Postma et al. ............ 455/417 |
| 2012/0117274 A1 | 5/2012 | Lydon et al. |

OTHER PUBLICATIONS

International Search Report and Written Opinion for International Appl. No. PCT/US2009/68482, mailed on Feb. 23, 2010, 12 pages.

International Search Report and Written Opinion received for PCT Application No. PCT/US2011/048109, mailed on Dec. 12, 2011, 10 pages.

* cited by examiner

SYSTEM CONTAINING A MOBILE COMMUNICATION DEVICE AND ASSOCIATED DOCKING STATION

CROSS-REFERENCE TO RELATED APPLICATIONS

This application claims priority to U.S. Provisional Patent Application No. 61/374,504, filed Aug. 17, 2010 and entitled "System Containing a Communication Device and Accompanying Handset Dock," the entirety of which is incorporated by reference herein.

FIELD OF TECHNOLOGY

The subject matter disclosed herein is directed to mobile communication devices and docking stations that are designed to engage such devices.

BACKGROUND

Recently, more and more individuals are relying on mobile communication devices, such as smart phones, to place and receive voice calls. Additionally, software-based telephony applications that utilize Voice over Internet Protocol (VoIP) technology can be executed on portable computing devices (e.g., tablet computers and laptop computers) having network connectivity, thereby enabling those devices to operate as mobile communication devices. These smart phones and portable computing devices are also capable of providing their users with a plethora of useful and entertaining features that extend far beyond telephony services. For example, such smart phones and portable computing devices can also run a multitude of different applications that enable a user to send and receive e-mails and instant messages, browse the Web, maintain a calendar or contact list, obtain weather information, obtain location information and maps, take pictures, create, obtain and play video and/or audio content, create and review documents, and the like.

In contrast to these mobile communication devices, conventional desktop telephones typically do not provide such a rich array of features. Rather, the utility of these telephones has changed little from when they were first introduced. Even so, many users have become accustomed to the more traditional interface provided by desktop telephones and are thus less comfortable with the telephony interfaces provided by mobile communication devices. For example, some users are more comfortable entering telephone numbers using a traditional keypad than they are interacting with numbers appearing on a touch screen display of a smart phone. As another example, some users are more comfortable conducting a voice call using a traditional handset that is ergonomically designed for interaction with a human face than they are conducting a voice call using a smart phone or portable computing device. Moreover, many users prefer the reliability of a dedicated telephone device that is always available and not at the mercy of a computer being powered down, disconnected from the network, or experiencing performance problems.

In addition, many desktop telephones are wired telephones while many mobile communication devices rely on wireless communication. Many users believe that wired telephones possess superior voice call quality and higher reliability when compared to mobile communication devices that rely on wireless communication.

SUMMARY

A communication system is described herein that includes a mobile communication device and a docking station with which the mobile communication device can be selectively engaged and disengaged. The mobile communication device includes telephony logic that enables a user to conduct a voice call using a first speaker/microphone and/or a first network interface provided by the mobile communication device when the mobile communication device is disengaged from the docking station and that enables the user to conduct a voice call using a second speaker/microphone and/or a second network interface provided by the docking station when the mobile communication device is engaged with the docking station. The telephony logic is also capable of dynamically switching between the use of the first and second speakers/microphones and/or the first and second network interfaces in response to detecting engagement or disengagement of the docking station during a voice call.

In particular, a communication system is described herein that includes a mobile communication device and a docking station. The mobile communication device includes a first microphone, a first speaker, telephony logic that enables a user to conduct a voice call, and a first docking interface. The docking station includes a second microphone, a second speaker, and a second docking interface that is configured to detachably engage the first docking interface of the mobile communication device, thereby permitting the mobile communication device to be selectively engaged with and disengaged from the docking station. When the mobile communication device is disengaged from the docking station, the telephony logic of the mobile communication device enables the user to conduct a voice call utilizing the first microphone and the first speaker. When the mobile communication device is engaged with the docking station, the telephony logic of the mobile communication device enables the user to conduct a voice call utilizing the second microphone and the second speaker.

A method for conducting a voice call by telephony logic on a mobile communication device that includes a first microphone and a first speaker is also described herein. In accordance with the method, the telephony logic conducts the voice call using the first microphone and the first speaker. The telephony logic then receives a signal from a detection component of the mobile communication device that indicates that the mobile communication device has been engaged with a docking station that includes a second microphone and a second speaker. In response to receiving the signal, the telephony logic switches from conducting the voice call using the first microphone and the first speaker to conducting the voice call using the second microphone and the second speaker.

Another method for conducting a voice call by telephony logic on a mobile communication device that includes a first microphone and a first speaker is also described herein. In accordance with the method, the telephony logic conducts the voice call using a second microphone and a second speaker of a docking station to which the mobile communication device is engaged. The telephony logic then receives a signal from a detection component of the mobile communication device that indicates that the mobile communication device has been disengaged from the docking station. In response to receiving the signal, the telephony logic switches from conducting the voice call using the second microphone and the second speaker to conducting the voice call using the first microphone and the first speaker.

Another communication system is also described herein. The communication system includes a mobile communication device and a docking station. The mobile communication device includes a first network interface for connecting to a first network, telephony logic that enables a user to conduct a voice call over the first network using the first network interface, and a first docking interface. The docking station includes a second network interface for connecting to a second network and a second docking interface that is configured to detachably engage the first docking interface of the mobile communication device, thereby permitting the mobile communication device to be selectively engaged with and disengaged from the docking station. When the mobile communication device is engaged with the docking station, the telephony logic of the mobile communication device enables the user to conduct a voice call over the second network using the second network interface.

A method for conducting a voice call by telephony logic on a mobile communication device that includes a first network interface is also described herein. In accordance with the method, the telephony logic conducts the voice call over a first network using the first network interface. The telephony logic then receives a signal from a detection component of the mobile communication device that indicates that the mobile communication device has been engaged with a docking station that includes a second network interface. In response to receiving the signal, the telephony logic switches from conducting the voice call over the first network using the first network interface to conducting the voice call over the second network using the second network interface.

Another method for conducting a voice call by telephony logic on a mobile communication device that includes a first network interface is also described herein. In accordance with the method, the telephony logic conducts the voice call over a second network using a second network interface of a docking station to which the mobile communication device is engaged. The telephony logic then receives a signal from a detection component of the mobile communication device that indicates that the mobile communication device has been disengaged from the docking station. In response to receiving the signal, the telephony logic switches from conducting the voice call over the second network using the second network interface to conducting the voice call over the first network using the first network interface.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
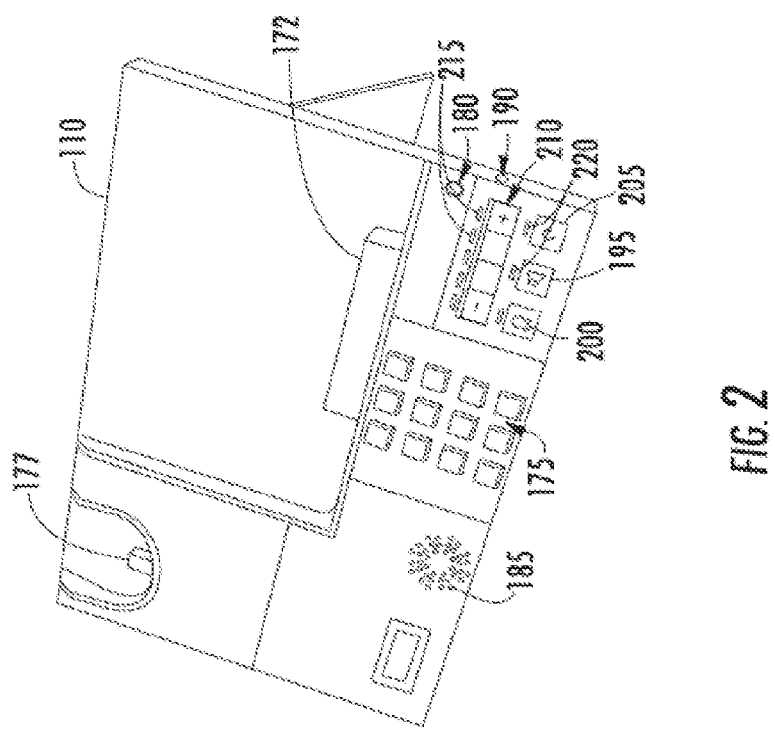
FIG. 1 illustrates a communication system in accordance with an embodiment that includes a mobile communication device engaged with a docking station.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention. Furthermore, numerous specific details are set forth herein in order to provide a thorough understanding of the described embodiments. However, it will be understood by persons skilled in the relevant art(s) that the embodiments described herein can be practiced without these specific details. In other instances, methods, procedures and components have not been described in detail so as not to obscure the related relevant feature being described. Also, the description is not to be considered as limiting the scope of the embodiments described herein.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Several definitions that apply throughout this document will now be presented. A "communication device" is defined as a device that is capable of transmitting to and/or receiving from another component wireless or wired signals containing at least data. A "mobile communication device" comprises a communication device that is portable. A "communication network" or "network" is defined a system or group of components that enables or facilitates the transfer of communication signals between devices and includes networks that are centrally managed, peer-to-peer or asynchronous arrangements and simple one-to-one connections. The term "multimedia data" is data that includes video and audio components, either both or exclusive of one another, and further includes data that can be processed to be presented in a form that can be perceived by humans. A "user interface" or "user interface component" is a component or a group of components that enable a human user to interact with a machine. A "docking interface" is a component or a group of components that enable or at least assist in enabling two or more separate elements to interact with another or become engaged with one another and is not limited to physical connectivity. A "voice call" is a communication in which a human or a machine provides at least speech for the purpose of conducting a conversation with another human or machine over a communication network or connection and may or may not include communications involving the broadcast of still or moving images.

A "touch screen display" is a display in which at least a portion of the display is capable of receiving user directed commands initiated by direct physical contact of a human finger or other physical device or through touchless interaction between the display and the finger or physical device within a predetermined distance of the display. The term "control element" means an element that is capable of being manipulated by a human for purposes of entering commands or causing some associated action in a device that presents or contains the element. A "bracket" is defined as a physical structure capable of providing mechanical support to a device. A "transceiver" is defined as a component or a group of components that are capable of transmitting and/or receiving wireless or wired signals to or from another source. A "detection component" is defined as a component or group of components that is capable of detecting an engagement or disengagement of two or more interfaces or other elements. The phrase "telephony features" is defined as processes, aspects or structures that are associated with the facilitation or enhancement of voice calls.

As discussed above, when placing or receiving voice calls, many users may prefer interacting with a traditional desktop telephone user interface as opposed to a user interface provided by a mobile communication device, such as a smart phone, tablet computer, or laptop computer. As also discussed above, many users prefer the reliability of a dedicated telephone device such as a traditional desktop telephone that is always available and not at the mercy of a computer being powered down, disconnected from the network, or experiencing performance problems. Even the most ardent supporters of desktop telephones, however, acknowledge that these devices lack the rich set of features commonly provided by many mobile communication devices. The description here relates to a system that enables a mobile communication device that is capable of conducting voice calls to be selectively extended to include a desktop telephone style user interface and a wired network connection.

In particular, a communication system is described below that includes a mobile communication device and a docking station with which the mobile communication device can be selectively engaged to increase the functionality of the mobile communication device. When the mobile communication device is disengaged from the docking station, telephony logic within the mobile communication device enables a user to conduct a voice call using components of the mobile communication device alone. For example, in this mode of operation, the telephony logic may use at least a first speaker/ microphone and/or a first network connection (e.g., a wireless network connection) provided by the mobile communication device to enable the user to conduct a voice call. When the mobile communication device is engaged with the docking station, the telephony logic enables the user to conduct a voice call using at least a second speaker/microphone and/or a second network connection provided by the docking station. In accordance with certain implementations, the second speaker/microphone may be embodied in a handset and the second network connection may comprise a wired network connection.

As will also be described below, the aforementioned telephony logic may be further capable of dynamically switching between the use of the first speaker, first microphone and/or first network connection to conduct a voice call and the use of the second speaker, second microphone and/or second network connection to conduct the voice call in response to detecting the engagement or disengagement of the mobile communication device from the docking station during the voice call.

Because a feature-rich mobile communication device that is capable of conducting voice calls can be engaged with a docking station that provides a traditional desktop telephone user interface and wired network interface, a system described herein can provide a user with the best of both worlds—the rich set of features provided by the mobile communication device along with the comfort and reliability associated with using a desktop telephone having a wired network connections.

B. Example Communication System

Figure 2:
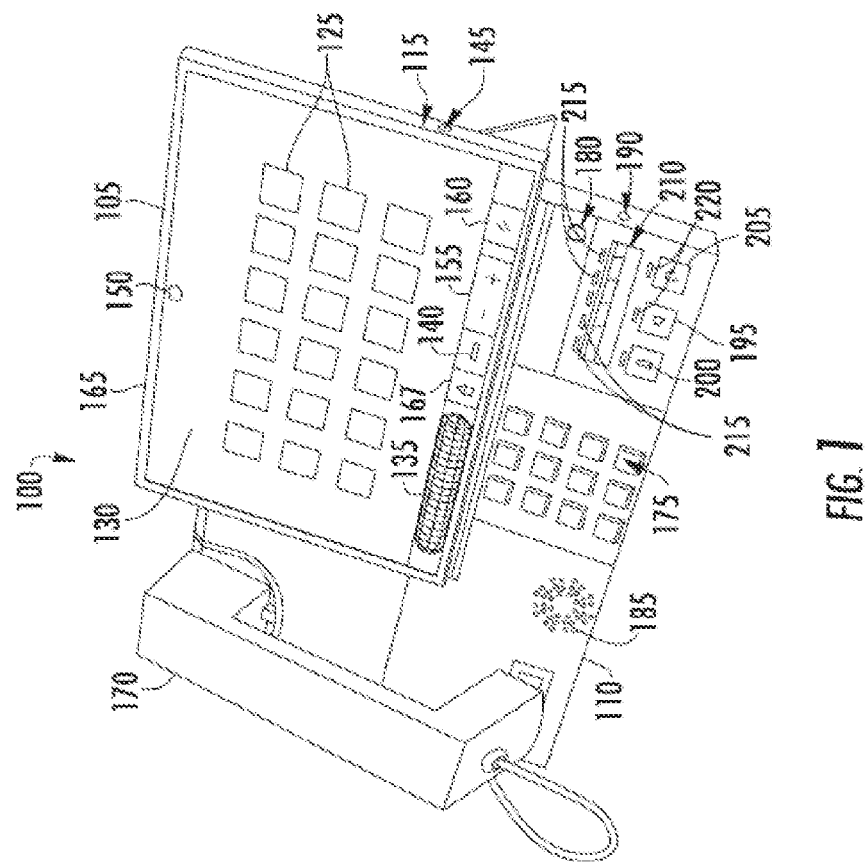
FIG. 2 illustrates the docking station of FIG. 1.
Figure 3:
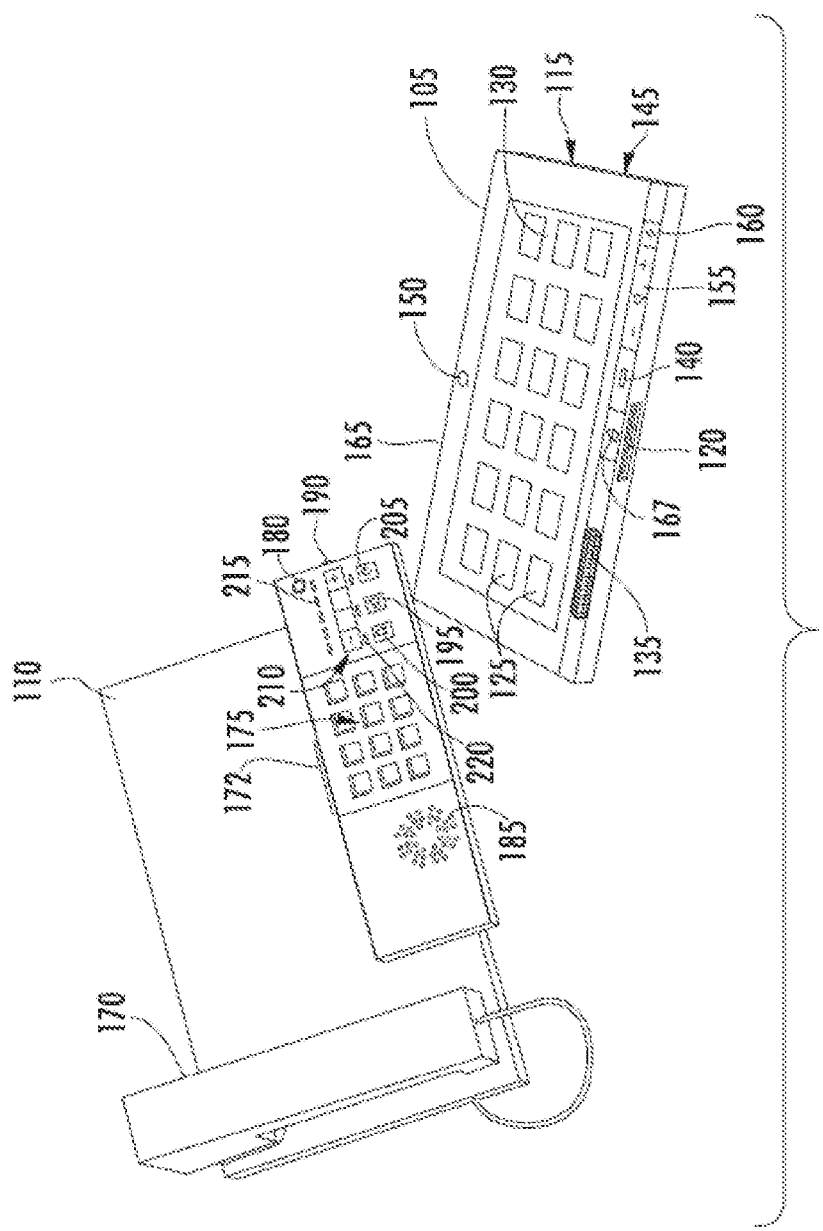
FIG. 3 illustrates the communication system of FIG. 1 with the mobile communication device disengaged from the docking station.

Referring to FIG. 1, a communication system 100 is shown that includes a mobile communication device 105 and a docking station 110. Mobile communication device 105 is configured to independently conduct voice calls as well as provide access to multi-media data over one or more communication networks (not shown). In this context, the phrase "independently" means without having to rely on docking station 110 or some other docking component or station for support (either physical or electrical). As will be explained below, mobile communication device 105 may be selectively engaged with and disengaged from docking station 110. Mobile communication device 105 is shown as being engaged with docking station 110 in FIG. 1. When engaged with docking station 110, mobile communication device 105 enables a user to conduct voice calls by interacting with user interface components of docking station 110 instead of or in addition to interacting with user interface components of mobile communication device 105. Furthermore, when engaged with docking station 110, mobile communication device 105 may conduct voice calls and provide access to multi-media data using a network interface of docking station 110. Referring to FIGS. 2 and 3, examples of mobile communication device 105 removed from docking station 110 are shown.

Referring to both FIGS. 1 and 3, mobile communication device 105 may include a user interface 115 and a docking interface 120 (shown only in FIG. 3). As an example, mobile communication device 105 may comprise a tablet computer that is capable of accessing one or more communication networks to enable a user to conduct voice calls and access various types of data, such as multi-media data. Such communication networks may include, for example and without limitation, a network operated in accordance with any of the 802.11 or 802.15 standards, a cellular network or the PSTN. Mobile communication device 105 may also include various connectors or plug-ins to accommodate other connections, like universal serial bus (USB), Ethernet and high definition multi-media interface (HDMI). In one particular example, mobile communication device 105 is configured to execute a plurality of applications, each of which may be presented as a single icon 125 to enable quick and efficient interaction therewith. In further accordance with this example, a user of mobile communication device 105 may easily adjust the number and type of applications stored on mobile communication device 105, such as by downloading applications from an application store.

In one arrangement, user interface 115 of mobile communication device 105 includes a touch screen display 130, which may be activated by direct touching from a human finger or an inanimate object, like a stylus. In addition, touch screen display 130 may be configured to receive commands when an input device is positioned above (but not necessarily touching) touch screen display 130, as is known in the art. User interface 115, however, is not limited to a touch screen display and may include mechanical buttons, keys, or other components that are configured to accept user input in a manner that does not involve components that are displayed on a touch screen display. Touch screen display 130 may also present to a user various control elements that may be manipulated or set by the user to enable the user to control features or components of mobile communication device 105.

User interface 115 of mobile communication device 105 may also include other components. For example, user interface 115 may include one or more speakers 135, one or more microphones 140, one or more headset connections 145, and one or more cameras 150. Of course, user interface 115 of mobile communication device 105 is not limited to these examples, as other suitable user interface components may be part of or attachable to mobile communication device 105.

User interface 115 of mobile communication device 105 may also include one or more controls by which a user may control other user interface components of user interface 115. As an example, user interface 115 may include a volume control 155 and a microphone control button 160, which respectively may be used to control a volume of speaker 135 (or any other speaker coupled to mobile communication device 105, such as through headset connection 145) and an input sensitivity of microphone 140. This input sensitivity may also include a complete or substantially complete muting of microphone 140 to prevent microphone 140 from capturing audio. Although examples of the user interface controls are pictured here as being physically integrated into mobile communication device 105, it is to be understood that such controls may also be presented via touch screen display 130 for manipulation by a user. Moreover, the settings of the various user interface components of mobile communication device 105 may be accessed and displayed on touch screen display 130 or some other suitable element of mobile communication device 105. In accordance with a further implementation, mobile communication device 105 may include suitable voice recognition software and circuitry for receiving and processing voice commands and/or suitable gesture recognition software and circuitry for receiving and processing gesture-based commands Touch screen display 130 and one or more of the user interface components described above and their associated controls may be contained within a housing 165 of mobile communication device 105.

User interface 115 of mobile communication device 105 may optionally include a default home button 167, which may be built into housing 165 of mobile communication device 105. Alternatively, default home button 167 may be presented in visual form on touch screen display 130 of mobile communication device 105. When default home button 167 is activated, touch screen display 130 may present a default home screen (not shown). This default home screen may be, for example, an introductory display that is normally shown when mobile communication device 105 is powered up or activated and may feature access to various menus or selections.

In one embodiment, mobile communication device 105 is configured to conduct voice calls. Conducting a voice call may or may not include the initiation of the voice call. The execution of a voice call on mobile communication device 105 may occur when mobile communication device 105 is disengaged or removed from docking station 110. As an example, mobile communication device 105 may enable a user to engage in a voice call independent of docking station 110 when mobile communication device 105 is removed from docking station 110. In one particular example, mobile communication device 105 may include circuitry and software to communicate with a communication network for the purposes of conducting a voice call independent of docking station 110. The communication network may comprise for example a wide area network (WAN), such as a cellular network, or a local area network (LAN), such as a wireless local area network (WLAN). Alternatively or additionally, mobile communication device 105 may be configured to conduct a voice call in conjunction with docking station 110 when mobile communication device 105 is removed from docking station 110. For example, mobile communication device 105 may include circuitry and software to enable mobile communication device 105 to communicate with docking station 110, such as through a LAN, WLAN or even a personal area network (PAN). In this way, docking station 110 may serve as a conduit or facilitator for mobile communication device 105 by relaying voice signals and signaling information between mobile communication device 105 and a communication network responsible for managing the voice call.

In view of the ability of mobile communication device 105 to conduct voice calls, one or more of the user interface components described above may be used to control settings of a voice call. The phrase "to control settings of a voice call" is defined as a process of manipulating, facilitating, adjusting, preventing or enhancing the aspects or parameters of a voice call. Examples of user interface components of mobile communication device 105 that may control settings of a voice call include touch screen display 130, speaker 135, microphone 140, headset connection 145, camera 150 and their associated controls, volume control 155 and microphone control button 160. For example, volume control 155 may be adjusted to vary the intensity of the audio emanating from speaker 135 during a voice call. Similarly, camera 150 may be used to facilitate a voice call that includes a video component, while microphone control button 160 may be activated to block audio from being captured by microphone 140 and introduced into the voice call. As noted earlier, one or more of these user interface components may be presented via touch screen display 130, thereby allowing a user to control the settings of the voice call through touch screen display 130.

It is to be understood that the user interface components of mobile communication device 105 described herein are not limited to interaction with voice calls, as the user interface components may be used to control, adjust or activate settings or parameters associated with data that is received by mobile communication device 105. For example, touch screen display 130 may display video content associated with a downloaded music video, while speaker 135 or a headset (not shown) connected to headset connection 145 may broadcast audio content associated therewith.

In describing docking station 110, further reference will be made to FIGS. 1, 2 and 3. Docking station 110 provides additional components that may be used by mobile communication device 105 and/or a user thereof in conducting voice calls over one or more communication networks. In one arrangement, docking station 110 includes a handset 170 comprising a microphone and speaker (not shown) and a docking interface 172 (shown in FIGS. 2 and 3). Handset 170 may be ergonomically designed for interaction with a human face when a voice call is being conducted using docking station 110. The phrase "ergonomically designed for interaction with a human face" is defined as the incorporation of elements to permit a human to direct and hear speech in at least a single, stationary act.

Docking interface 172 of docking station 110 is configured to detachably engage docking interface 120 of mobile communication device 105, which permits mobile communication device 105 to be selectively engaged with and disengaged from docking station 110. As used herein, the phrase "detachably engage" means an engagement that can be selectively broken and re-engaged. Various structures can be employed to achieve this engagement, including pins and accompanying apertures or even contactless interfaces that transfer data via electromagnetic interaction. Mobile communication device 105 is considered engaged with docking station 110 when it is possible to transmit and receive signals between docking interface 120 of mobile communication device 105 and docking interface 172 of docking station 110. Conversely, mobile communication device 105 is considered to be removed or disengaged from docking station 110 when docking interface 120 of mobile communication device 105 and docking interface 172 of docking station 110 are not able to receive signals from one another. It must be noted, however, that when mobile communication device 105 is removed from docking station 110 in accordance with this principle, mobile communication device 105 may still be able to exchange signals with docking station 110 through components other than docking interface 120 and docking interface 172. For example, mobile communication device 105 may be capable of exchanging signals with docking stations 110 over a wired or wireless connection when removed from docking station 110.

There are several ways in which docking station 110 can extend the capabilities of mobile communication device 105 when mobile communication device 105 is engaged therewith. For example, docking station 110 may provide an extended user interface by which a user can interact with mobile communication device 105 to conduct a voice call. As noted above, this extended user interface may include a handset 170 containing a microphone and speaker that a user may use when conducting a voice call. As another example, docking station 110 may include a keypad 175 or some other suitable structure to enable a user to enter information necessary to conduct a voice call. Docking station 110 may also include an on/off hook switch 177 (see FIG. 2), which can establish or discontinue voice call connections similar to conventional telephones. Still further, docking station 110 may include a microphone 180 and a speaker 185 for conducting a voice call in speakerphone mode and a headset connection 190 for facilitating headset calls. In one embodiment, microphone 180 may comprise an array microphone. As will be appreciated by persons skilled in the relevant art(s), an array microphone may be used to provide advanced noise reduction and/or echo cancellation features to docking station 110.

Docking station 110 may also provide one or more additional network interfaces by which mobile communication device 105 can conduct a voice call and/or transmit or receive data when mobile communication device 105 is engaged with docking station 110. For example, docking station 110 may include one or more interfaces for communicating with a WAN, a LAN, a WLAN, a PAN and/or the PSTN and can also include connectors for establishing other connections, like USB, Ethernet and HDMI. It must also be noted that docking station 110 may also provide additional functionality that is not related to conducting voice calls. For example, docking station 110 may include features that facilitate facsimile transmission and/or receipt.

Docking station 110 may include one or more user interface components for controlling settings of a voice call being conducted by mobile communication device 105 using user interface components of docking station 110. For example, docking station 110 may include one or more controls that are configured to control microphone 180, speaker 185 or headset connection 190. For example, docking station 110 may include a volume control 195 and a microphone control button 200, which respectively can be used to control a volume of speaker 185 (or any other speaker coupled to docking station 110, such as through headset connection 190) and an input sensitivity of microphone 180. This input sensitivity can include a complete or substantially complete muting of microphone 180. A headset connection control 205 and a settings display 210 may also be incorporated into docking station 110. Headset connection control 205 may be used to switch audio channeling from speaker 185 or some other similar component to headset connection 190. Furthermore, settings display 210 may be an array of light emitting diodes (LED) 215, which may be selectively illuminated to provide a user with an indication as to a setting for a particular user interface component. For example, a greater number of LEDs 215 can be illuminated to indicate a corresponding increase in volume. Additional LEDs 220 may be positioned above microphone 180, speaker 185, headset connection 190 or any other suitable component as, for example, an on/off status indicator.

It is noted that mobile communication device 105 may also provide user interface components that enable a user to conduct and/or control the settings of a voice call when mobile communication device is docked with docking station 110. For example, a virtual keypad (not shown) and/or other controls associated with a voice call can be displayed on touch screen display 130, which can enable a user to dial numbers and manipulate other parameters of the call. Depending upon the implementation, these user interface components of mobile communication device 105 may be provided instead of or in addition to the corresponding user interface components of docking station 110. For example, in one embodiment, docking station 110 does not include keypad 175 and instead a virtual keypad is presented to the user via touch screen display 130 to initiate voice calls.

In one embodiment, controls provided by mobile communication device 105 may be used to control associated user interface components of docking station 110. For example, volume control 155 and microphone control button 160 of mobile communication device 105 may be used to respectively control speaker 185 and microphone 180 of docking station 110. Touch screen display 130 can also present to a user control elements that can be adjusted or set by a user to permit the user to control various features, settings or components of docking station 110. Furthermore, the controls of docking station 110 may be configured to control associated user interface components of mobile communication device 105. For example, volume control 195, microphone control button 200 and headset connection control 205 of docking station 110 may be used to respectively control speaker 135, microphone 140 and headset connection 145 of mobile communication device 105. In certain implementations, the cross control scenarios described above are only achievable when mobile communication device 105 is engaged with docking station 110, via the communication of signals over docking interfaces 120, 172. However, this need not be the case, and the cross control may also be achieved when mobile communication device 105 is disengaged from docking station, via the communication of signals over some other wired or wireless connection between the two components.

When mobile communication device 105 is engaged with docking station 110, docking station 110 may make available to mobile communication device 105 a network interface that is not otherwise available to mobile communication device 105 when mobile communication device 105 is not engaged therewith. This feature can enable docking station 110 to enhance the operation of mobile communication device 105. For example, mobile communication device 105 may only be able to independently conduct voice calls over one or more wireless networks. However, when engaged with docking station 110, mobile communication device 105 may be capable of using a wired network connection provided by docking station 110 to conduct voice calls over a wired network (e.g., an Ethernet or the PSTN). Depending upon the implementation, this augmentation of the features of mobile communication device 105 may occur only when mobile communication device 105 is engaged with docking station 110 via the communication of signals over docking interfaces 120, 172. However, in other implementations, such augmentation may be possible even when mobile communication device 105 is disengaged from docking station, via the communication of signals over some other wired or wireless connection between the two components.

In one implementation, docking station 110 may also extend the functionality of mobile communication device 105 by providing telephony features relating to the conducting of a voice call that would not otherwise be available to mobile communication device 105. Such extensions may be made available to mobile communication device 105 through engagement with docking station 110, or through establishment of some other wired or wireless connection there between. Various non-limiting examples of these telephony features include may include call waiting, call forwarding, speakerphone mode, caller identification, incoming call detection and voice messaging. Incoming call detection can include various ring tones or other audible, visual or tactile indicators, which may or may not occur during a call. The telephony features can also be thought of as encompassing hardware items, such as handset 170 or keypad 175. Moreover, docking station 110 may include a display (not shown) for showing information related to any one of the telephony features. In another arrangement, information related to the telephony features can be displayed on touch screen display 130 of mobile communication device 105.

Figure 4:
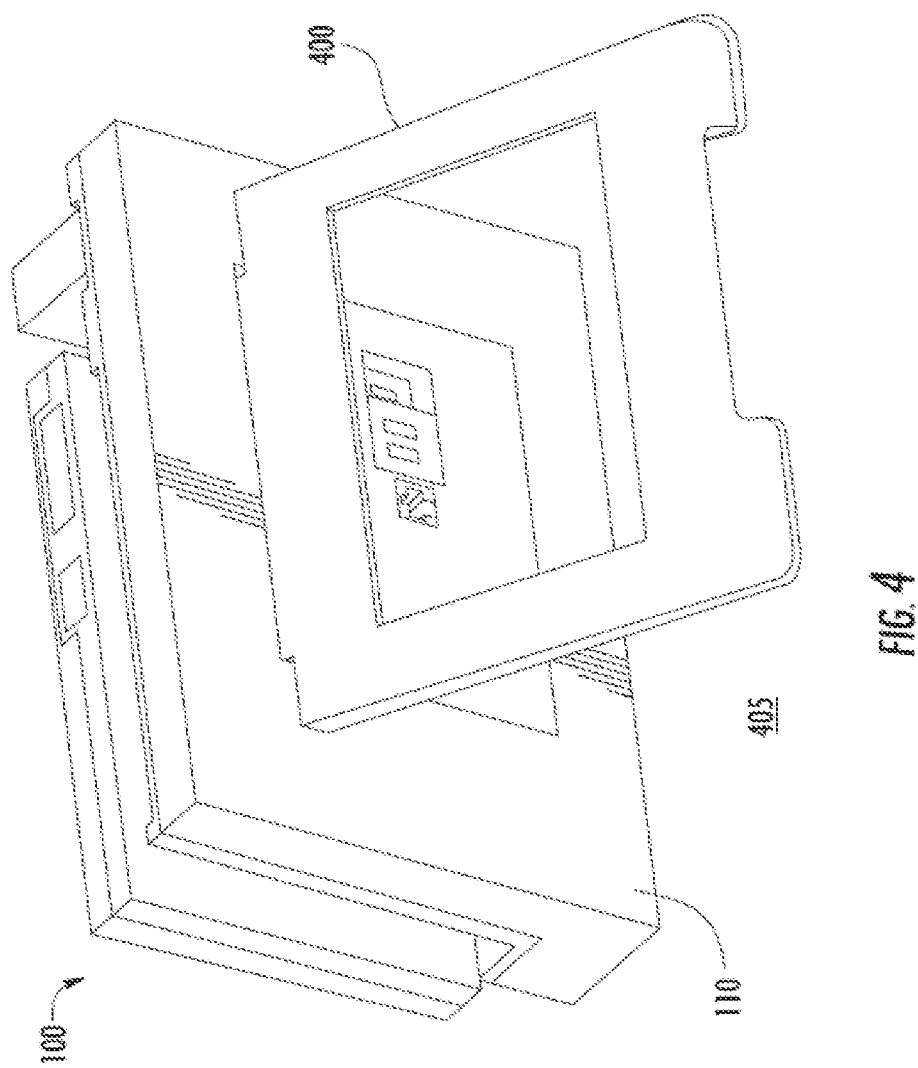
FIG. 4 illustrates a perspective rear view of the communication system of FIG. 1.

Referring to FIG. 4, a rear perspective view of communication system 100 is shown. In this illustration, a bracket 400 is shown attached to docking station 110. Bracket 400 may be pivotably attached to docking station 110 and may be configured to position and stabilize docking station 110 at an angle with respect to a surface 405 on which docking station 110 rests. This angle can be any suitable value for presenting an optimal viewing experience for a user, including one that is true vertical with respect to surface 405. When mobile communication device 105 is engaged with docking station 110, mobile communication device 105 can be positioned and stabilized at approximately the same angle as docking station 110. An example of this configuration is shown in FIGS. 1 and 4. Both mobile communication device 105 and docking station 110, however, can be designed such that mobile communication device 105 can rest at a different angle with respect to that of docking station 110 when engaged with docking station 110.

Figure 5:
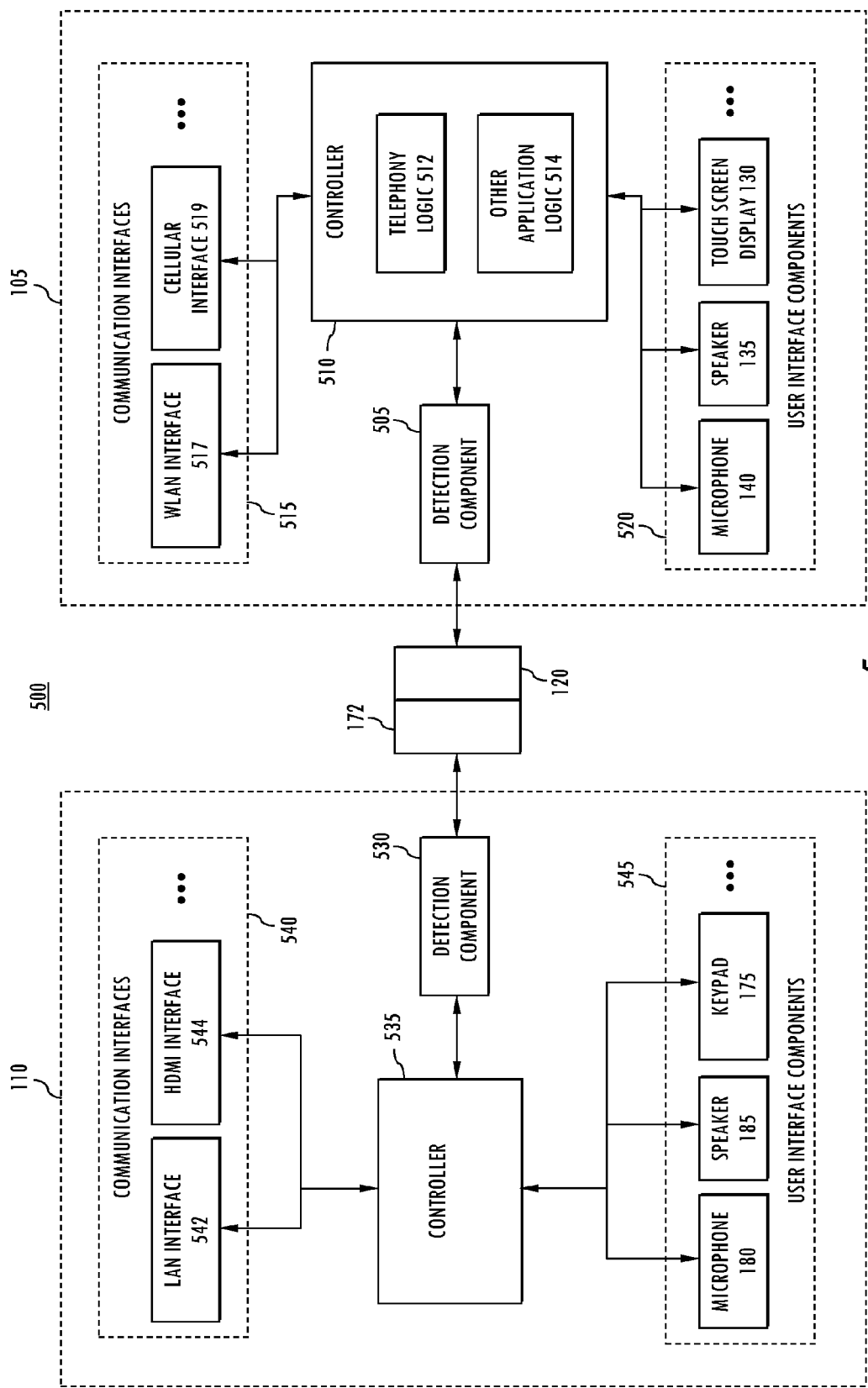
FIG. 5 is a block diagram of a first exemplary implementation of the mobile communication device and the docking station of FIG. 1 in an engaged state.

Referring to FIG. 5, a block diagram 500 is presented that shows an exemplary implementation of mobile communication device 105 and docking station 110 engaged with one another. Here, docking interface 120 of mobile communication device 105 is shown as being engaged with docking interface 172 of docking station 110.

Mobile communication device 105 may include a detection component 505, which can be coupled to docking interface 120. Mobile communication device 105 may further include a controller 510, one or more user interface components 520, and one or more communication interfaces 515. Detection component 505 may be coupled to controller 510 and controller 510 may be coupled to each of user interface components 520 and communication interfaces 515. Detection component 505 may also be directly coupled to one or more of communication interfaces 515. User interface components 520 may include microphone 140, speaker 135, touch screen display 130 and any of the other user interface components of mobile communication device 105 as previously described as well as other user interface components not previously described. Communication interfaces 115 may include a WLAN interface 517, such as 802.11 interface, a cellular interface 519, as well as a variety of other types of interfaces by which mobile communication device 105 can communicate with other entities over various communication networks and mediums. Each of communication interfaces 515 may comprise a transceiver as well as other components that are useful for conducting wireless or wired communications, such as digital signal processors (DSP), baseband processors, encoders, decoders, antennas, etc.

Detection component 505 of mobile communication device 105 can be implemented using suitable hardware, firmware, software, or any combination thereof.

Controller 510 may further include telephony logic 512 that enables a user to conduct a voice call using mobile communication device 105 and other application logic 514 that enables a user to perform other functions using mobile communication device 105. For example, such other functions may include but are not limited to sending and receiving e-mails and instant messages, Web browsing, maintaining a calendar or contact list, obtaining weather information, obtaining location information and maps, taking pictures, creating, obtaining and playing video and/or audio content, creating and review documents, and the like. In accordance with one implementation, telephony logic 512 and other application logic 514 comprise software modules and controller 510 comprises a microprocessor or microcontroller that executes such software or modules. In accordance with alternate implementations, one or more of telephony logic 512 and other application logic 514 are implemented in hardware, or as a combination of software and hardware.

As further shown in FIG. 5, docking station 110 may include a controller 535, one or more user interface components 545, and one or more communication interfaces 540. Controller 535 may be coupled to each of user interface components 545 and communication interfaces 540. User interface components 545 may include microphone 180, speaker 185, keypad 175 and any of the other user interface components of docking station 110 as previously described as well as other user interface components that were not previously described. Communication interfaces 540 may include a LAN interface 542, such as an Ethernet interface, an HDMI interface 544, as well as a variety other types of interfaces by which docking station 110 can communicate with other entities over various communication networks and mediums. Each of communication interfaces 540 may comprise a transceiver as well as other components that are useful conducting wireless or wired communications, such as digital signal processors (DSP), baseband processors, encoders, decoders, antennas, etc.

In one embodiment, the engagement of docking interface 120 of mobile communication device 105 with docking interface 172 of docking station 110 enables the transfer of one or more of power, video data, audio data, network data and control information between the two components. For example, in an engaged state, docking station 110 may provide power to mobile communication device 105 to charge one or more batteries of mobile communication device 105 (not shown in FIG. 5). Docking station 110 may route power to mobile communication device 105 that is received by docking station 110, for example, via a Power over Ethernet (POE) connection or via a connection to an AC power source such as a utility. Docking station 110 may include a voltage converter for performing the power supply function.

When engaged, docking interface 120 and docking interface 172 may further enable network data to be conveyed between any one of communication interfaces 540 of docking station 110 and mobile communication device 105. For example, packetized audio content associated with a VoIP voice call may be transferred between a network interface of docking station 110 (e.g., LAN interface 542) and telephony logic 512 of mobile communication device 105, thereby enabling telephony logic 512 to conduct a VoIP voice call. Likewise, packetized audio and video content may be transferred between a network interface of docking station 110 and telephony logic 512 of mobile communication device 150 to enable telephony logic 512 to conduct a video teleconference. In a similar manner, other application logic 514 of mobile communication device 105 may transmit or receive network data via a network interface of docking station 110 to support functions of such other application logic 514.

Still further, when engaged, docking interface 120 and docking interface 172 may enable audio data to be conveyed between mobile communication device 105 and docking station 110. For example, while conducting a voice call, telephony logic 512 of mobile communication device 105 may receive audio data representing audio signals received by microphone 180 of docking station 110 and packetize such audio data for network transmission. Likewise, while conducting a voice call, telephony logic 512 of mobile communication device 105 may obtain audio data from packets received over a network and provide such audio data for playback by speaker 185 of docking station 110. In a similar manner, other application logic 514 of mobile communication device 105 may transmit or receive audio data to or from docking station 110 to support functions of such other application logic 514.

Additionally, when engaged, docking interface 120 and docking interface 172 may enable video data to be conveyed between mobile communication device 105 and docking station 110. For example, video data associated with a video teleconference being conducted by telephony logic 512 may be transferred to docking station 110, which is configured to route such video data to a video output port of docking station 110 (e.g., HDMI interface 544) for viewing on a display connected to docking station 110. Likewise, video data generated by other application logic 514 may be routed to a video output port of docking station 110 for viewing on a display connected to docking station 110.

Alternatively, video data associated with a video teleconference being conducted by telephony logic 512 may be displayed via touch screen display 130. Thus, when mobile communication device 105 is engaged with docking station 110, a video teleconference may be conducted in which touch screen display 130 is used to display video content associated with the video teleconference and microphone 180 and speaker 185 (or, alternatively, a microphone/speaker of handset 170 or a headset connected to headset connection 190) of docking station 110 are utilized to receive and output audio content associated with the video teleconference, respectively.

In accordance with one embodiment, a video output port of docking station 110 may be connected to a display, such as a computer monitor, and a keyboard and mouse may be connected to mobile communication device 105 via a wired or wireless (e.g., BLUETOOTH® or USB) link. By using such a configuration and a virtual desktop infrastructure (VDI), a user of communication system 100 may be able to simulate the experience of sitting in front of a computer without having a computer. In accordance with such an embodiment, virtual desktop software running on mobile communication device 105 communicates with a remote computer to serve a desktop over a network interface and the desktop is displayed on the display connected to the video output port of docking station 110. Alternatively, the desktop may be displayed on display 130 of mobile communication device 105.

Furthermore, when engaged, docking interface 120 and docking interface 172 may enable control data to be conveyed between mobile communication device 105 and docking station 110. As previously described, the transfer of such control data may enable a user to interact with user interface components 520 of mobile communication device 105 to control one or more settings associated with user interface components 545 of docking station 110. Likewise, the transfer of such control data may enable a user to interact with user interface components 545 of docking station 110 to control one or more settings associated with user interface components 520 of mobile communication device 105.

In accordance with one embodiment, telephony logic 512 is configured to conduct a voice call utilizing various ones of user interface components 520 when mobile communication device 105 is disengaged from docking station 110. For example, when mobile communication device 105 is disengaged from docking station 110, telephony logic 512 may enable a user to conduct a voice call utilizing microphone 140, speaker 135, and touch screen display 130. In further accordance with such an embodiment, telephony logic 512 may be further configured to enable a user to conduct a voice call utilizing various ones of user interface components 545 when mobile communication device 105 is engaged with docking station 110. For example, when mobile communication device 105 is engaged with docking station, telephony logic 512 may enable a user to conduct a voice call utilizing keypad 175, microphone 180, speaker 185, or handset 170.

In accordance with a further embodiment, telephony logic 512 may also be configured to conduct a voice call utilizing a communication interface of mobile communication device 105 when mobile communication device 105 is disengaged from docking station 110. For example, when mobile communication device 105 is disengaged from docking station 110, telephony logic 512 may enable a user to conduct a voice call utilizing a wireless network interface of mobile communication device 105 (e.g., WLAN interface 517 or cellular interface 519). In further accordance with such an embodiment, telephony logic 512 may be further configured to enable a user to conduct a voice call utilizing a communication interface of docking station 110 when mobile communication device 105 is engaged with docking station 110. For example, when mobile communication device 105 is engaged with docking station, telephony logic 512 may enable a user to conduct a voice call using a wired network interface of mobile communication device 105 (e.g., LAN interface 542 or a PSTN interface of mobile communication device 105).

Communication system 100 may also be designed to dynamically switch between using user interface components and/or a network interface of docking station 110 to conduct a voice call to using user interface components and/or a network interface of mobile communication device 100 to conduct the same voice call without requiring the voice call to be terminated and then re-established. Such dynamic transfer may occur in response to detection of the engagement of mobile communication device 105 with docking station 110 or the disengagement of mobile communication device 105 from docking station 110.

Figure 6:
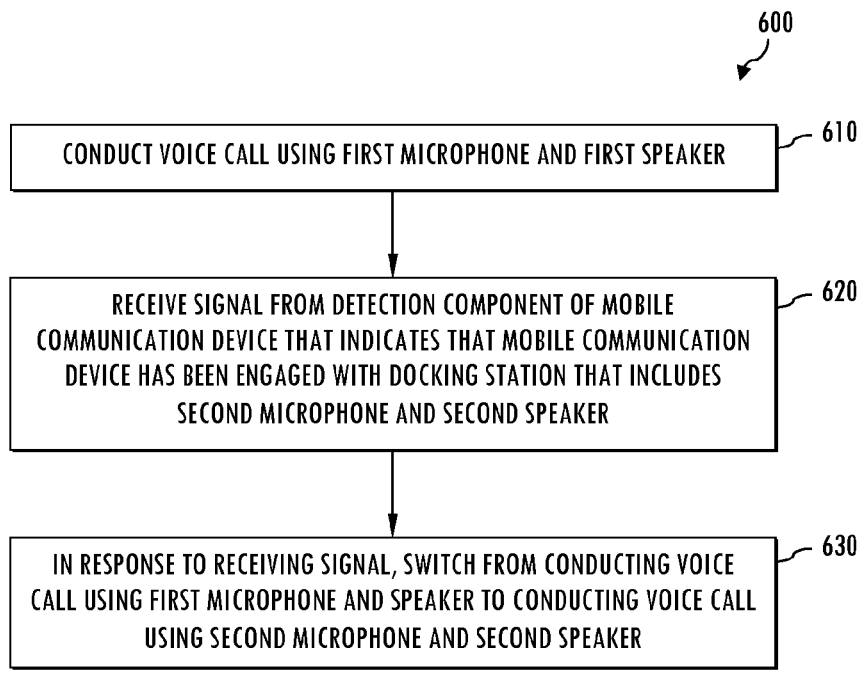
FIG. 6 depicts a flowchart of an example method for conducting a voice call by telephony logic on a mobile communication device that involves dynamically switching from using a first microphone and first speaker of the mobile communication device to using a second microphone and second speaker of a docking station.

By way of example, FIG. 6 depicts a flowchart of an example method by which telephony logic 512 of mobile communication device 105 may conduct a voice call. As shown in FIG. 6, the method of flowchart 600 begins at step 610 in which telephony logic 512 conducts the voice call using a first microphone and first speaker of mobile communication device. For example, telephony logic 512 may conduct the voice call using microphone 140 and speaker 135.

At step 620, telephony logic 512 receives a signal from detection component 505 of mobile communication device 105 that indicates that mobile communication device 105 has been engaged with docking station 110, which includes a second microphone and speaker. As noted above, detection component 505 is coupled to docking interface 120. Detection component 505 is configured to detect when a connection has been established between docking interface 120 and docking interface 172, which signifies that mobile communication device 105 has been engaged with docking station 110, and to transmit a signal to telephony logic 512 in response to detecting such a connection.

At step 630, in response to receiving the signal, telephony logic 512 switches from conducting the voice call using the first microphone and first speaker to conducting the voice call using the second microphone and the second speaker. For example, in response to receiving the signal, telephony logic 512 may switch from conducting the voice call using microphone 140 and speaker 135 of mobile communication device 105 to using microphone 180 and speaker 185 of docking station 110. As another example, in response to receiving the signal, telephony logic 512 may switch from conducting the voice call using microphone 140 and speaker 135 of mobile communication device 105 to using a microphone and speaker of handset 170 of docking station 110. Such switching does not require that the voice call be terminated and re-established.

Figure 7:
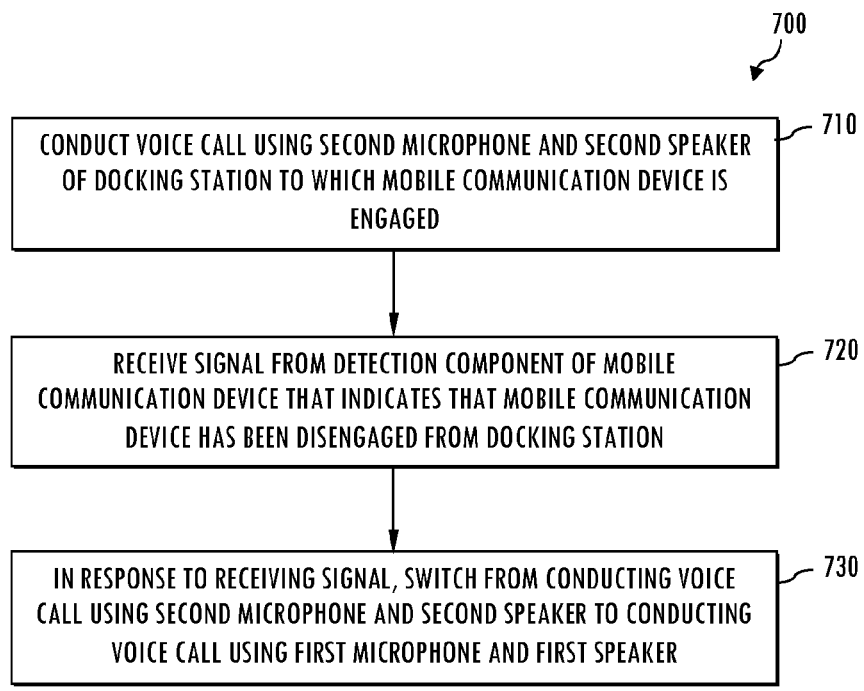
FIG. 7 depicts a flowchart of an example method for conducting a voice call by telephony logic on a mobile communication device that involves dynamically switching from using a second microphone and second speaker of a docking station to using a first microphone and a first speaker of the mobile communication device.

FIG. 7 depicts a flowchart of another example method by which telephony logic 512 of mobile communication device 105 may conduct a voice call. As shown in FIG. 7, the method of flowchart 700 begins at step 710 in which telephony logic 512 conducts the voice call using a second microphone and second speaker of docking station 110 while mobile communication device 105 is engaged with docking station 110. The second microphone and second speaker may be, for example, microphone 180 and speaker 185 of docking station 110 or a microphone and speaker of handset 170 of docking station 110.

At step 720, telephony logic 512 receives a signal from detection component 505 of mobile communication device 105 that indicates that mobile communication device 105 has been disengaged from docking station 110. As noted above, detection component 505 is coupled to docking interface 120. Detection component 505 is configured to detect when a connection between docking interface 120 and docking interface 172 has been broken, which signifies that mobile communication device 105 has been disengaged from docking station 110, and to transmit a signal to telephony logic 512 in response to detecting such a connection.

At step 730, in response to receiving the signal, telephony logic 512 switches from conducting the voice call using the second microphone and second speaker of docking station 110 to conducting the voice call using a first microphone and a first speaker of mobile communication device 105. For example, in response to receiving the signal, telephony logic 512 may switch from conducting the voice call using microphone 180 and speaker 185 of docking station 110 to using microphone 140 and speaker 135 of mobile communication device 105. As another example, in response to receiving the signal, telephony logic 512 may switch from conducting the voice call using the microphone and speaker of handset 170 to using microphone 140 and speaker 135 of mobile communication device 105. Such switching does not require the voice call to be terminated and re-established.

Figure 8:
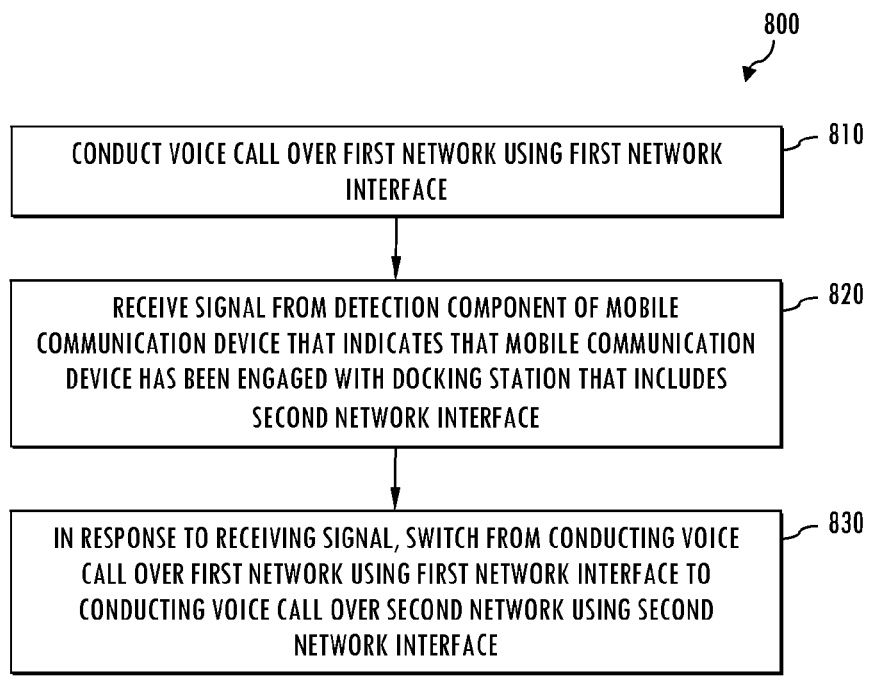
FIG. 8 depicts a flowchart of an example method for conducting a voice call by telephony logic on a mobile communication device that involves dynamically switching from using a first network interface of the mobile communication device to using a second network interface of a docking station.

Such dynamic switching may also involve dynamically changing the network interface being used to conduct the voice call. By way of example, FIG. 8 depicts a flowchart of another example method by which telephony logic 512 of mobile communication device 105 may conduct a voice call. As shown in FIG. 8, the method of flowchart 800 begins at step 810 in which telephony logic 512 conducts the voice call over a first network using a first network interface of mobile communication device 105. For example, telephony logic 512 may conduct the voice call over a wireless network using a wireless network interface of mobile communication device, such as WLAN interface 517 or cellular interface 519.

At step 820, telephony logic 512 receives a signal from detection component 505 of mobile communication device 105 that indicates that mobile communication device 105 has been engaged with docking station 110, which includes a second network interface. As noted above, detection component 505 is coupled to docking interface 120. Detection component 505 is configured to detect when a connection has been established between docking interface 120 and docking interface 172, which signifies that mobile communication device 105 has been engaged with docking station 110, and to transmit a signal to telephony logic 512 in response to detecting such a connection.

At step 830, in response to receiving the signal, telephony logic 512 switches from conducting the voice call over the first network using the first network interface to conducting the voice call over a second network using the second network interface. For example, in response to receiving the signal, telephony logic 512 may switch from conducting the voice call over a wireless network using a wireless network interface of mobile communication device 105 (e.g., WLAN interface 517 or cellular interface 519) to conducting the voice call over a wired network using a wired network interface of docking station 110 (e.g., LAN interface 542 or some other wired network interface). As discussed above, conducting the voice call using the second network interface may involve routing network packets by telephony logic 512 through docking interfaces 120 and 172. Such switching does not require the voice call to be terminated and re-established.

Figure 9:
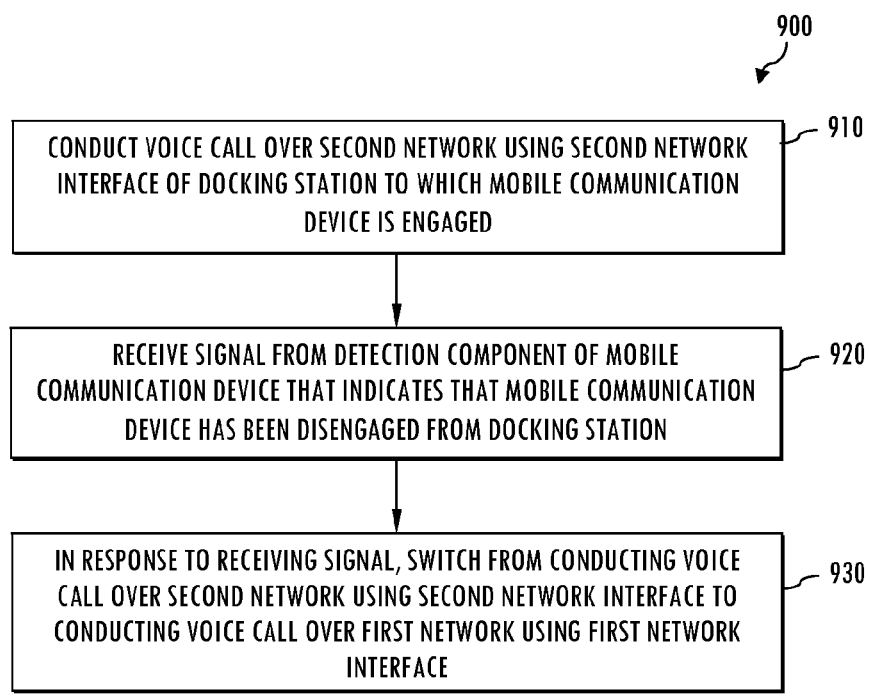
FIG. 9 depicts a flowchart of an example method for conducting a voice call by telephony logic on a mobile communication device that involves dynamically switching from using a second network interface of a docking station to using a first network interface of the mobile communication device.

FIG. 9 depicts a flowchart of another example method by which telephony logic 512 of mobile communication device 105 may conduct a voice call. As shown in FIG. 9, the method of flowchart 900 begins at step 910 in which telephony logic 512 conducts the voice call over a second network using a second network interface of docking station 110 while mobile communication device 105 is engaged with docking station 110. This step may involve, for example, conducting the voice call over a wired network using a wired network interface of docking station 110 (e.g., LAN interface 542 or some other wired network interface).

At step 920, telephony logic 512 receives a signal from detection component 505 of mobile communication device 105 that indicates that mobile communication device 105 has been disengaged from docking station 110. As noted above, detection component 505 is coupled to docking interface 120. Detection component 505 is configured to detect when a connection between docking interface 120 and docking interface 172 has been broken, which signifies that mobile communication device 105 has been disengaged from docking station 110, and to transmit a signal to telephony logic 512 in response to detecting such a connection.

At step 930, in response to receiving the signal, telephony logic 512 switches from conducting the voice call over the second network using the second network interface of docking station 110 to conducting the voice call over a first network using a first network interface of mobile communication device 105. For example, in response to receiving the signal, telephony logic 512 may switch from conducting the voice call over a wired network using a wired network interface of docking station 110 (e.g., LAN interface 542 or some other wired network interface) to conducting the voice call over a wireless network using a wireless network interface of mobile communication device 105 (e.g., WLAN interface 517 or cellular interface 519). Such switching does not require the voice call to be terminated and re-established.

It should be noted that components other than those mentioned above may be involved in switching between the use of different user interface components and network interfaces of mobile communication device 105 and docking station 105. Moreover, such switching may occur to support activities or communications beyond voice calls. For example, such switching may occur to support any number of other applications that require the use of user interface components or network communication.

Figure 10:
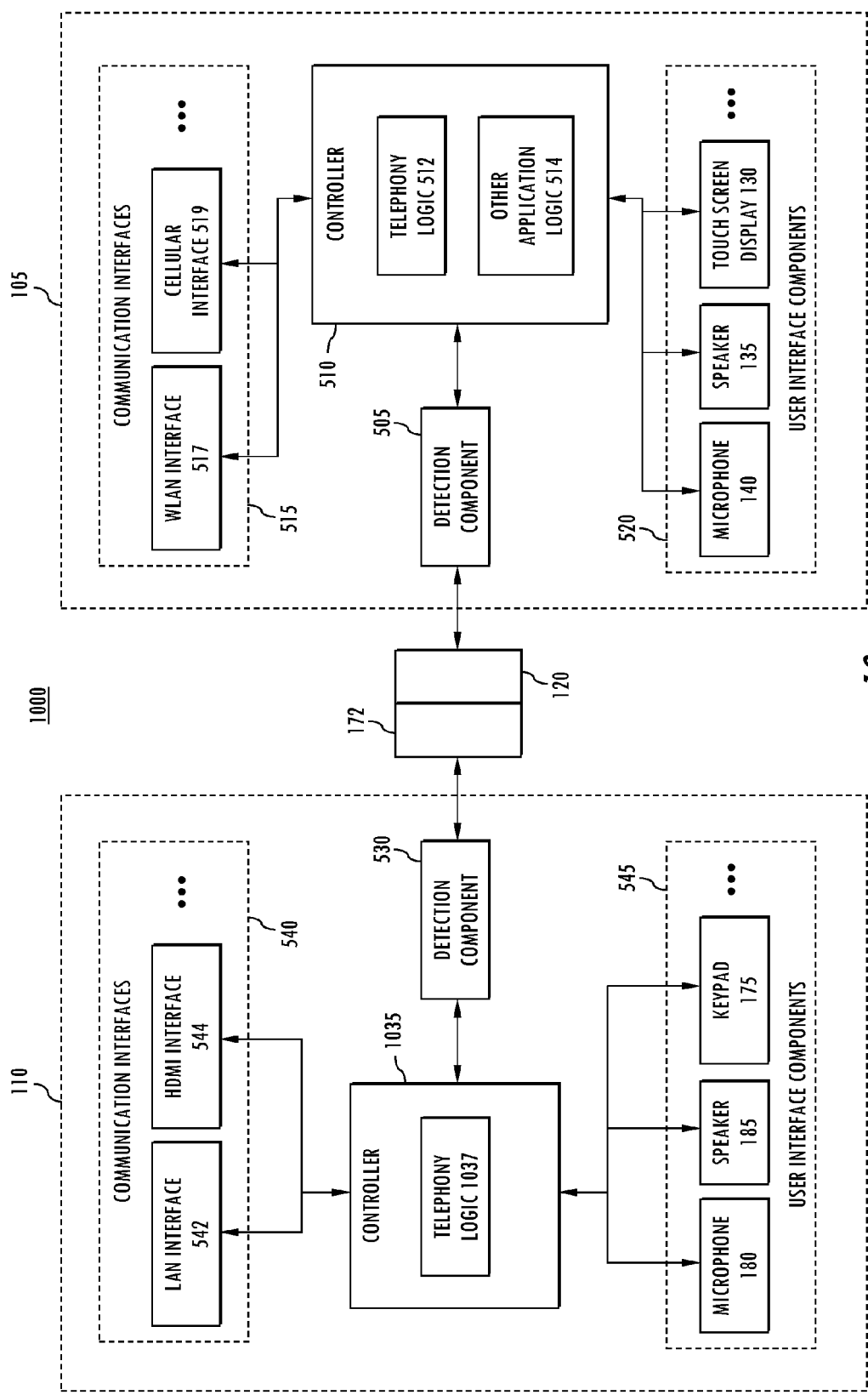
FIG. 10 is a block diagram of a second exemplary implementation of the mobile communication device and the docking station of FIG. 1 in an engaged state.

Referring to FIG. 10, a block diagram 1000 is presented that shows an alternative implementation of mobile communication device 105 and docking station 110 engaged with one another. In accordance with this alternative implementation, docking station 110 includes its own telephony logic 1037, thereby enabling docking station 110 to conduct voice calls irrespective of whether mobile communication device 105 is engaged with docking station 110. Thus, docking station 110 can conduct voice calls independent of mobile communication device 105.

In one embodiment of this alternative implementation, docking station 110 and mobile communication device 105 may be configured to set mobile communication device 105 as the default facilitator for placing a voice call when mobile communication device 105 is engaged with docking station 110. Specifically, when engaged, keypad 175 may be disabled, and a user can enter digits to conduct a call through any suitable user interface of mobile communication device 105, such as through a keypad (not shown) displayed on touch screen display 130. When mobile communication device 105 is removed from docking station 110, keypad 175 of the base 110 may be re-enabled and control of the call initiation can be returned to docking station 110.

As further shown in FIG. 10, docking station 110 may include its own detection component 1030 that may detect when mobile communication device 105 is engaged with or disengaged from docking station 110 and that may signal telephony logic 1037 accordingly. This enables telephony logic 1037 to dynamically switch between using various user interface components and network interfaces of docking station 110 when the components are disengaged and using various user interface components and network interfaces of mobile communication device 105 when the components are engaged in a like manner to that described above in reference to telephony logic 512 of mobile communication device 105.

In a still further implementation of communication system 100 (not shown), only docking station 110 includes telephony logic for enabling a user to conduct a voice call. In accordance with such an implementation, docking station 110 may enhance the operation of mobile communication device 105. For example, docking station 110 can provide a user of mobile communication device with voice call capability where such a characteristic would not normally be available to the user of mobile communication device 105. This augmentation of the ability of mobile communication device 105 may occur when mobile communication device 105 is engaged with or removed from docking station 110. In this scenario, mobile communication device 105 can exchange signals with docking station 110 through docking interfaces 120, 172, some other hard-wired connection or through a wireless connection.

Various functions and features of mobile communication device 105 and docking station 110 as described above may be implemented in hardware, software, firmware, or any combination thereof. For example, various functions and features of mobile communication device 105 and docking station 110 as described above may be implemented as computer program code configured to be executed in one or more processors. Alternatively, the functions and features may be implemented using hardware logic/electrical circuitry.

Figure 11:
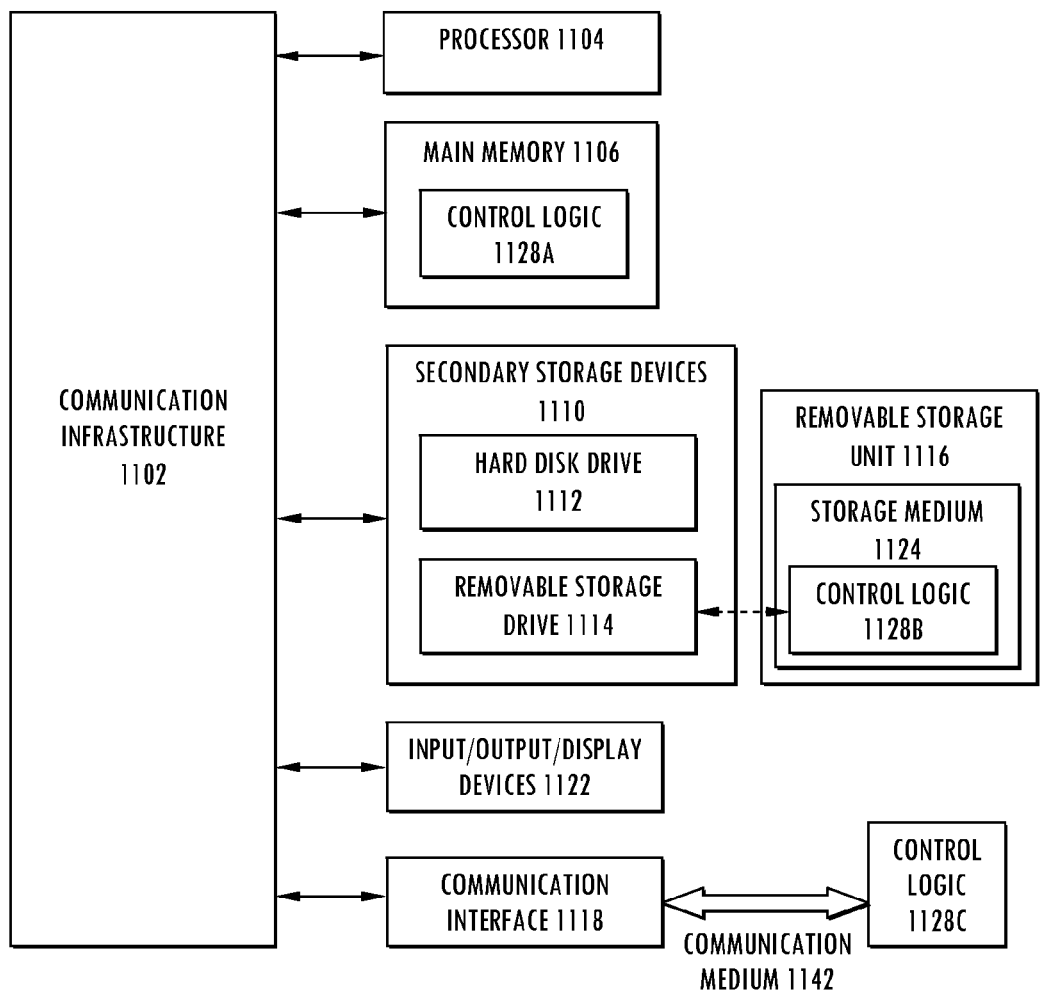
FIG. 11 is a block diagram of an example computing device that may be used to implement one or more aspects of the present invention.

Each of mobile communication device 105 and docking station 100 may be implemented in the form of a computing device 1100 as shown in FIG. 11. Computing device 1100 includes one or more processors (also called central processing units, or CPUs), such as a processor 1104. Processor 1104 is connected to a communication infrastructure 1102, such as a communication bus. In some embodiments, processor 1104 can simultaneously operate multiple computing threads.

Computing device 1100 also includes a primary or main memory 1106, such as random access memory (RAM). Main memory 1106 has stored therein control logic 1128A (computer software), and data.

Computing device 1100 also includes one or more secondary storage devices 1110. Secondary storage devices 1110 include, for example, a hard disk drive 1112 and/or a removable storage device or drive 1114, as well as other types of storage devices, such as memory cards and memory sticks. For instance, computing device 1100 may include an industry standard interface, such a universal serial bus (USB) interface for interfacing with devices such as a memory stick. Removable storage drive 1114 represents a floppy disk drive, a magnetic tape drive, a compact disk drive, an optical storage device, tape backup, etc.

Removable storage drive 1114 interacts with a removable storage unit 1116. Removable storage unit 1116 includes a computer useable or readable storage medium 1124 having stored therein computer software 1128B (control logic) and/or data. Removable storage unit 1116 represents a floppy disk, magnetic tape, compact disk, DVD, optical storage disk, or any other computer data storage device. Removable storage drive 1114 reads from and/or writes to removable storage unit 1116 in a well known manner.

Computing device 1100 also includes input/output/display devices 1122, such as monitors, keyboards, pointing devices, etc.

Computing device 1100 further includes a communication or network interface 1118. Communication interface 1118 enables computing device 1100 to communicate with remote devices. For example, communication interface 1118 allows computing device 1100 to communicate over communication networks or mediums 1142 (representing a form of a computer useable or readable medium), such as LANs, WANs, the Internet, etc. Communication interface 1118 may interface with remote sites or networks via wired or wireless connections.

Control logic 1128C may be transmitted to and from computing device 1100 via communication medium 1142.

Any apparatus or manufacture comprising a computer useable or readable medium having control logic (software) stored therein is referred to herein as a computer program product or program storage device. This includes, but is not limited to, computing device 1100, main memory 1106, secondary storage devices 1110, and removable storage unit 1116. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules that include computer program logic for implementing the features of each of mobile communication device 105 and/or docking station 110, as well as any of the sub-systems or components contained therein, any of the methods or steps of the flowcharts of FIGS. 6-9, and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

C. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A communication system, comprising:
   a mobile communication device that includes
   a first microphone,
   a first speaker,
   a display,
   telephony logic that enables a user to conduct a voice call, and
   a first docking interface; and
   a docking station that includes
   a second microphone,
   a second speaker, and
   a second docking interface that is configured to detachably engage the first docking interface of the mobile communication device, thereby permitting the mobile communication device to be selectively engaged with and disengaged from the docking station;
   wherein when the mobile communication device is disengaged from the docking station, the telephony logic of the mobile communication device enables the user to conduct a voice call utilizing the first microphone and the first speaker and when the mobile communication device is engaged with the docking station, the telephony logic of the mobile communication device enables the user to conduct a voice call utilizing the second microphone and the second speaker, the voice call being conductable over networks independently by the mobile communication device and dependently via the docking station,
   wherein the mobile communication device further includes a user interface that enables the user to control one or more settings associated with the docking station when the mobile communication device is engaged with the docking station, and
   wherein, when the mobile communication device is engaged with the docking station, the telephony logic of the mobile communication device enables the user to conduct a video teleconference in which the display is used to display video content associated with the video teleconference and the second microphone and the second speaker are utilized to receive an output audio content associated with the video teleconference.

2. The system of claim 1, wherein the docking station includes a handset that includes the second microphone and the second speaker.

3. The system of claim 1, wherein the user interface enables the user to control one or more settings associated with the second microphone or the second speaker when the mobile communication device is engaged with the docking station.

4. The system of claim 1, wherein the docking station further includes a keypad that enables the user to enter information that is used by the telephony logic to conduct a voice call when the mobile communication device is engaged with the docking station.

5. The system of claim 1, wherein the docking station further includes a video output port, and wherein the docking station is configured to route video data received from the mobile communication device to the video output port when the mobile communication device is engaged with the docking station.

6. The system of claim 1, wherein the mobile communication device further includes a detection component that detects when the mobile communication device has been engaged with the docking station, and wherein the telephony logic is configured to switch from using the first microphone and the first speaker to conduct a voice call to using the second microphone and the second speaker to conduct the voice call in response to receiving a signal from the detection component that indicates that the mobile communication device has been engaged with the docking station during the voice call.

7. The system of claim 1, wherein the mobile communication device further includes a detection component that detects when the mobile communication device has been disengaged from the docking station, and wherein the telephony logic is configured to switch from using the second microphone and the second speaker to conduct a voice call to using the first microphone and the first speaker to conduct the voice call in response to receiving a signal from the detection component that indicates that that the mobile communication device has been disengaged from the docking station during the voice call.

8. The system of claim 1, wherein the docking station is configured to provide power to the mobile communication device when the mobile communication device is engaged with the docking station.

9. The system of claim 1, wherein the docking station is configured to provide one or more telephony features to the mobile communication device when the mobile communication device is engaged with the docking station, the one or more telephony features including at least one of call waiting, call forwarding, speakerphone mode, caller identification, incoming call detection and voice messaging.

10. A method for conducting a voice call by telephony logic on a mobile communication device that includes a first microphone, a first speaker and a display, the method comprising:
  conducting the voice call using the first microphone and the first speaker;
  receiving a signal from a detection component of the mobile communication device that indicates that the mobile communication device has been engaged with a docking station that includes a second microphone and a second speaker;
  in response to receiving the signal, switching from conducting the voice call using the first microphone and the first speaker to conducting the voice call using the second microphone and the second speaker, the voice call being conductable over networks independently by the mobile communication device and dependently via the docking station;
  when the mobile communication device is engaged with the docking station:
    enabling a user to control one or more settings associated with the docking station using a user interface of the mobile communication device; and
    enabling the user to conduct a video teleconference in which the display is used to display video content associated with the video teleconference and the second microphone and the second speaker are utilized to receive an output audio content associated with the video teleconference.

11. A method for conducting a voice call by telephony logic on a mobile communication device that includes a first microphone and a first speaker, the method comprising:
  conducting the voice call using a second microphone and a second speaker of a docking station to which the mobile communication device is engaged;
  receiving a first signal from a detection component of the mobile communication device that indicates that the mobile communication device has been disengaged from the docking station;
  in response to receiving the first signal, switching from conducting the voice call using the second microphone and the second speaker to conducting the voice call using the first microphone and the first speaker, the voice call being conductable over networks independently by the mobile communication device and dependently via the docking station;
  receiving a second signal from the detection component of the mobile communication device that indicates that the mobile communication device has been engaged with the docking station; and
  in response to receiving the second signal, sending video data to the docking station for routing to a video output port of the docking station.

12. A communication system, comprising:
  a mobile communication device that includes
    a first network interface for connecting to a first network;
    telephony logic that enables a user to conduct a voice call over the first network using the first network interface, and
    a first docking interface; and
  a docking station that includes
    a second network interface for connecting to a second network; and
    a video output port;
    a second docking interface that is configured to detachably engage the first docking interface of the mobile communication device, thereby permitting the mobile communication device to be selectively engaged with and disengaged from the docking station;
  wherein when the mobile communication device is engaged with the docking station, the telephony logic of the mobile communication device enables the user to conduct a voice call over the second network using the second network interface, and
  wherein the docking station is configured to route video data received from the mobile communication device to the video output port when the mobile communication is engaged with the docking station.

13. The system of claim 12, wherein the first network interface comprises a wireless network interface for connecting to a wireless network and wherein the second network interface comprises a wired network interface for connecting to a wired network.

14. The system of claim 12, wherein the mobile communication device further includes a user interface that enables the user to control one or more settings associated with the second network interface when the mobile communication device is engaged with the docking station.

15. The system of claim 12, wherein the mobile communication device further includes a detection component that detects when the mobile communication device has been engaged with the docking station, and wherein the telephony logic is configured to switch from using the first network connection to conduct a voice call to using the second network connection to conduct the voice call in response to receiving a signal from the detection component that indicates that the mobile communication device has been engaged with the docking station during the voice call.

16. The system of claim 12, wherein the mobile communication device further includes a detection component that detects when the mobile communication device has been disengaged from the docking station, and wherein the telephony logic is configured to switch from using the second network connection to conduct a voice call to using the first network connection to conduct the voice call in response to receiving a signal from the detection component that indicates that the mobile communication device has been disengaged from the docking station during the voice call.

17. The system of claim 12, wherein the mobile communication device further includes a first microphone and a first speaker and the docking station includes a handset comprising a second microphone and a second speaker, and wherein when the mobile communication device is disengaged from the docking station, the telephony logic of the portable computing device enables the user to conduct a voice call utilizing the first microphone and the first speaker and when the mobile communication device is engaged with the docking station, the telephony logic of the mobile communication device enables the user to conduct a voice call utilizing the second microphone and the second speaker.

18. The system of claim 12, wherein the mobile communication device further includes a user interface that enables the user to control one or more settings associated with the second microphone or the second speaker when the mobile communication device is engaged with the docking station.

19. The system of claim 17, wherein the mobile communication device further includes a detection component that detects when the mobile communication device has been engaged with the docking station, and wherein the telephony logic is configured to switch from using the first microphone and the first speaker to conduct a voice call to using the second microphone and the second speaker to conduct the voice call in response to receiving a signal from the detection component that indicates that the mobile communication device has been engaged with the docking station during the voice call.

20. The system of claim 17, wherein the mobile communication device further includes a detection component that detects when the mobile communication device has been disengaged from the docking station, and wherein the telephony logic is configured to switch from using the second microphone and the second speaker to conduct a voice call to using the first microphone and the first speaker to conduct the voice call in response to receiving a signal from the detection component that indicates that that the mobile communication device has been disengaged from the docking station during the voice call.

21. The system of claim 12, wherein the docking station further includes a keypad that enables the user to enter information that is used by the telephony logic to conduct a voice call when the mobile communication device is engaged with the docking station.

22. The system of claim 12, wherein the docking station is configured to provide power to the mobile communication device when the mobile communication device is engaged with the docking station.

23. The system of claim 12, wherein the docking station is configured to provide one or more telephony features to the mobile communication device when the mobile communication device is engaged with the docking station, the one or more telephony features including at least one of call waiting, call forwarding, speakerphone mode, caller identification, incoming call detection and voice messaging.

24. The system of claim 12, wherein the mobile communication device includes a display and, when the mobile communication device is engaged with the docking station, the telephony logic of the mobile communication device enables the user to conduct a video teleconference in which the display is used to display video content associated with the video teleconference and the second microphone and the second speaker are utilized to receive and output audio content associated with the video teleconference.

25. A method for conducting a voice call by telephony logic on a mobile communication device that includes a first network interface and a display, the method comprising:
conducting the voice call over a first network using the first network interface;
receiving a signal from a detection component of the mobile communication device that indicates that the mobile communication device has been engaged with a docking station that includes a second network interface;
in response to receiving the signal:
switching from conducting the voice call over the first network using the first network interface to conducting the voice call over the second network using the second network interface;
enabling a user to control one or more settings associated with the docking station using a user interface of the mobile communication device when the mobile communication device is engaged with the docking station; and
enabling the user to conduct a video teleconference in which the display is used to display video content associated with the video teleconference when the mobile communication device is engaged with the docking station.

26. A method for conducting a voice call by telephony logic on a mobile communication device that includes a first network interface and a display, the method comprising:
conducting the voice call over a second network using a second network interface of a docking station to which the mobile communication device is engaged;
receiving a first signal from a detection component of the mobile communication device that indicates that the mobile communication device has been disengaged from the docking station;
in response to receiving the first signal, switching from conducting the voice call over the second network using the second network interface to conducting the voice call over the first network using the first network interface
receiving a second signal from the detection component of the mobile communication device that indicates that the mobile communication device has been engaged with the docking station; and
in response to receiving the second signal, enabling a user to conduct a video teleconference in which the display is used to display video content associated with the video teleconference while the video teleconference is conducted over the second network.

* * * * *